United States Patent [19]

Overall et al.

[11] Patent Number: 5,631,746
[45] Date of Patent: May 20, 1997

[54] HIGH RESOLUTION SIMULATION PRINTING BY PRINTING ADJOINING PELS

[75] Inventors: Gary S. Overall; Phillip B. Wright, both of Lexington, Ky.

[73] Assignee: Lexmark International, Inc., Greenwich, Conn.

[21] Appl. No.: 340,005

[22] Filed: Nov. 15, 1994

[51] Int. Cl.$^6$ .............................. H04N 1/40; H04N 1/21; G06F 15/00
[52] U.S. Cl. ................ 358/448; 358/101; 358/296; 358/298; 382/299; 395/109
[58] Field of Search ...................... 358/448, 401, 358/296, 298, 447, 454, 455, 456, 457, 458, 459; 345/127, 129, 130, 132; 382/299, 293; 395/102, 109

[56] References Cited

U.S. PATENT DOCUMENTS

| | | | |
|---|---|---|---|
| 4,656,664 | 4/1987 | Anderson et al. | 382/47 |
| 4,893,258 | 1/1990 | Sakuragi | 358/451 |
| 5,042,075 | 8/1991 | Sato | 382/47 |
| 5,109,283 | 4/1992 | Carley | 358/298 |
| 5,123,082 | 6/1992 | Shimada | 395/102 |
| 5,327,256 | 7/1994 | Kang et al. | 358/445 |
| 5,363,211 | 11/1994 | Hasebe et al. | 358/451 |

FOREIGN PATENT DOCUMENTS

| | | | |
|---|---|---|---|
| 2239969 | 7/1991 | United Kingdom | G06K 15/10 |
| WO93/17399 | 2/1993 | WIPO | G06K 15/22 |

*Primary Examiner*—Edward L. Coles, Sr.
*Assistant Examiner*—Kimberly A. Williams
*Attorney, Agent, or Firm*—John A. Brady

[57] ABSTRACT

Printer (1) having the capability of printing at 600×2400 dpi resolution simulates 1200×1200 dpi resolution by logically examining two lines of a 1200×1200 bit map and printing identically when possible and half black when only one of the two vertically adjacent bits signifies black, the bits for half printing being located to the right if the preceding bit is white and being located to the left if the preceding bit is black. This places the bits for half printing beside black bits and thereby extends the length of black printed, thereby reducing high frequency effects.

4 Claims, 5 Drawing Sheets

HIGH RESOLUTION SIMULATION PRINTING BY PRINTING ADJOINING PELS

TECHNICAL FIELD

This invention relates to printing and other imaging in which the image is obtained in a high resolution and the image is printed in a lower resolution in at least one direction limited by capability of the imaging device to print. In a specific embodiment 1200×1200 dpi bit maps are printed at 600×2400 dpi.

BACKGROUND OF THE INVENTION

Printing from bit map data in resolution of 600 by 600 dots per inch (dpi) generally provides excellent printing, particularly when slanted lines are smoothed by techniques which vary the actual printing slightly from that of the bit map along such slanted lines. This is achieved in some prior art printers by driving an optical printhead a selected number of times while it traverses the photosensitive surface an amount defined by one bit location of the 600×600 data. The laser printhead in such prior printers inherently illuminates the photosensitive surface to a height for one pel of the bit map (pel is believed derived from the term "picture element" and is used as the term for the unit of printing by dots or rectangles or similar units). The height for such a pel in a 300×300 resolution printer is 1/300 inch. The printer, however, can be controlled to illuminate eight contiguous rectangular slices as its light traverses the width of each 1/300 inch pel. That previous enhancement of resolution drives the laser in various permutations of those eight parts of the pel to achieve a final visual impression of smoothed slanted lines. In the preferred embodiment of this invention a laser printhead is used as just described except that the inherent height of its beam on the photoconductor is that for 600×600 resolution printing. The number of slices for which it can be controlled is unchanged from the foregoing 300×300 printer, and therefore four slices can be illuminated or not along the width of the area corresponding to a 1/600 inch width pel. In the preferred embodiment the higher resolution data is 1200×1200 dpi.

U.S. Pat. No. 5,109,283 to Carley, particularly with respect to FIG. 12A and FIG. 12B, assumes in its disclosure an optical system for printing in which the optical beam may be started and ended on a large number of boundaries while that beam is swept across a medium. In the embodiment the inherent height of the beam is 1/300 inch. Data at 600×600 dpi resolution is printed by printing a rectangle in variable widths within the area representing 1/150 inch in width to 1/300 inch in height at the approximate center of gravity and of the approximate same darkness of all of the bits in the 600×600 data.

In accordance with this invention, efficient printing avoiding high frequency off-and-on driving of the laser is employed which creates adjoining rectangular slices, not one variable rectangle at the center of gravity. The final printing by xerographic techniques is excellent.

DISCLOSURE OF THE INVENTION

In accordance with this invention, a printer or other imaging device transforms data having a high resolution into data having a lower resolution in one direction and a higher resolution in the direction orthogonal to the one direction (which will be termed the printing resolution). The data is selected to be on when half of the pels in the high resolution bit map are on and to be located on the side of the pel area which coincides with where data would be on in the adjoining pels.

In the preferred embodiment, the one direction is the vertical direction in which a laser printhead produces light on a photosensitive member at an unvarying height to image 1/600 inch. The orthogonal direction is the horizontal direction in which the light from the laser is swept across the photosensitive member. In each pel position the laser has the capability of being driven during one, two, three or all four quarters of that pel area to illuminate the corresponding pel area. In accordance with this invention, when the four 1200×1200 dpi data bits corresponding to that pel area have all four bits signifying black (i.e., signifying color in the final image rather than no color), the laser is illuminated for all of that pel area. When that data has two vertical black bits, the illumination can be exactly that and so the illumination is the same as that data by illuminating the corresponding first two or last two quarters. When that data has one black bit, or two black bits in diagonal or horizontal, or three black bits (which can not be identically printed), one, two or three quarters respectively are illuminated in accordance with a scheme which assures that the illumination will be contiguous to any illumination in the horizontally adjoining quarters.

Specifically, alternating pel groups have their half illumination determined by the presence of illumination in the right half of the immediately preceding pel group. In this manner the frequency of laser operation may be reduced by one-half, resulting in more effective and reliable operation and reduced potential for radiated noise. (A less desirable alternative is to alternate the side of half illumination in contiguous pels groups. However, this can result in some isolated half illuminations where the foregoing logic does not.)

This can be implemented by logic which observes only two vertical 1200×1200 dpi data bits. If both represent black or on, both halves of the corresponding pel location are illuminated, and that data is printed identically to that of the 1200×1200 bit map. If neither of the two represent on, no illumination is made for that pel location. If only one signifies black or on, the half of the pel location is illuminated according to the predetermined pattern or additional logic. Logic can be used to determine if the right half of the preceding pel was illuminated. If so, the left half of the current pel location is illuminated. If not, the right half is illuminated. (It is clear that illumination may result in white in printing systems in which no illumination results in black. The difference is immaterial to this invention as the illumination in response to the black and white data bits is simply reversed.)

The modification of data in accordance with this invention can be made in a host computer and transmitted to the printer, as well as made in the printer itself. The term imaging device assembly will be used in accordance with this invention to encompass both modification in the printer and modification by a host computer which transmits the result for direct use by the printer.

BRIEF DESCRIPTION OF THE DRAWING

The details of this invention will be described in connection with the accompanying drawing, in which.

BEST MODE FOR CARRYING OUT THE INVENTION

In accordance with this invention the original bit map is binary (dark or white) data in 1200×1200 dots per inch resolution. Thus, the original data is generated on the assumption that each bit will dictate either black (or other color) or white (or contrasting color) for a square of 1/1200 inch width and length, and these squares will be contiguous in rows and columns. Such bit maps are conventional, and may be received by an imaging device 1 (FIG. 1) from a data cable 3 or generated in the imaging device from data in a page description language such as language for a PCL(R) interpreter (trademark of Hewlett-Packard Co.) or a PostScript(R) interpreter (trademark of Adobe Systems Incorporated). Depending on the page size of the data, the first predetermined number of bits (typically 9,600 bits) will be those for the first line and the succeeding same number of bits will be for each succeeding line (typically 13,200 lines).

Figure 1:
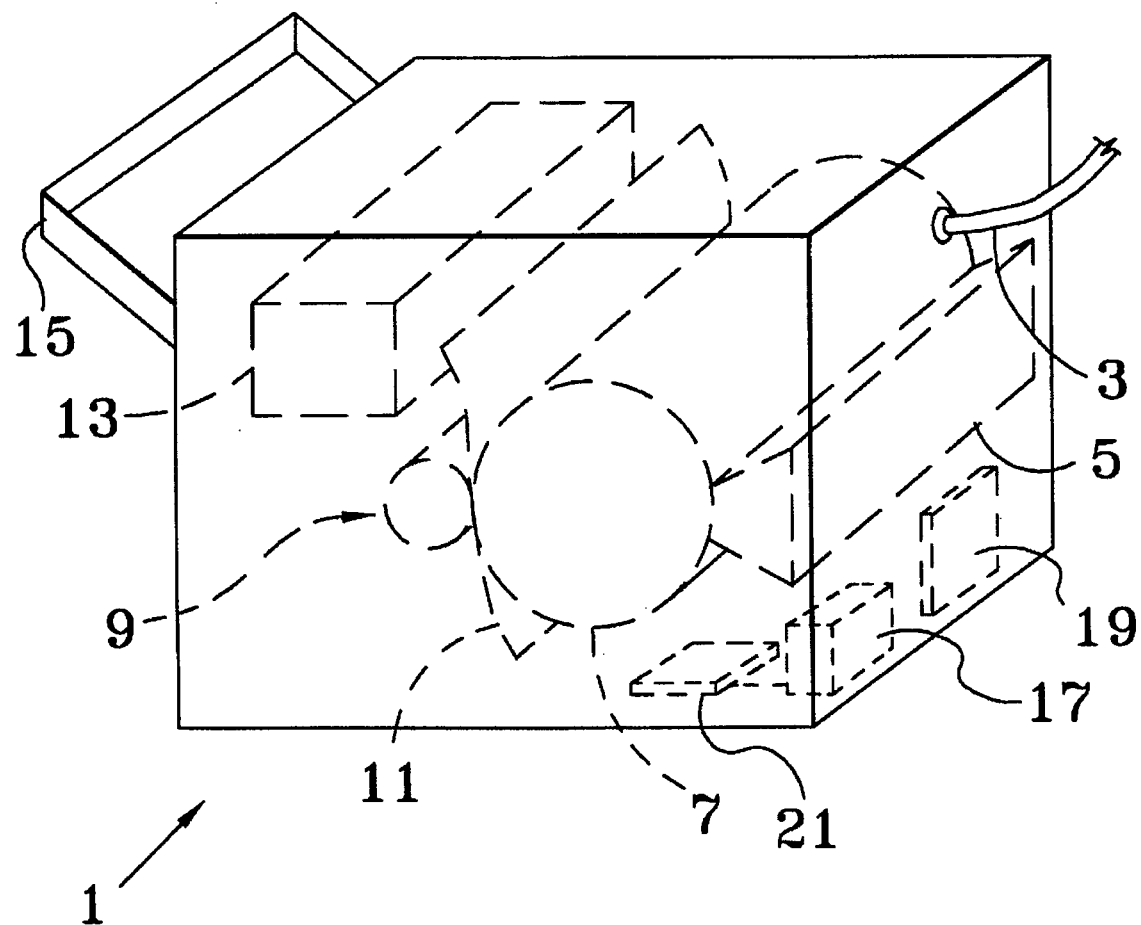
FIG. 1 is illustrative of a printer employing this invention.

An illustrative printer is shown in FIG. 1. Page information may be received by printer 1 in a standard manner from a communications cable 3. Printer 1 may be any suitable printer which has a printhead system to print in the 600× 2400 dpi resolution which this invention employs. For illustrative purposes printer 1 is shown suggestive of an electrophotographic printer having an optical system 5 operative on photoconductive drum 7. Drum 7 transfers images defined by optical system 5 at transfer station 9 to paper 11. The image is fixed, typically by heat, at fixing station 13, and the finished printed page is delivered to output tray 15.

Data processor 17 in printer 1 monitors the data received and may interpret the data in accordance to the control language to which the data processor 17 is set. Information received on cable 3, as well as other information, is stored electronically in memory 19. Bit information modified as described below is applied to control optical system 5.

Optical system 5 has an essentially standard laser printhead capable of illuminating sections 1/2400 inch wide across drum 7 and 1/600 inch around drum 7. Individual logic 21, typically an ASIC (application specific integrated circuit) is shown in association with data processor 17 to carry out this invention. Logic 21 may employ standard combinational logic. In practice logic 21 may perform other functions, including resolution enhancement, and data processor 17 may perform the logic operations.

Alternatively, a host computer might modify the data as described and send it to printer 1 on cable 3 as the final bit map for printing.

Figures 2A, 2B:
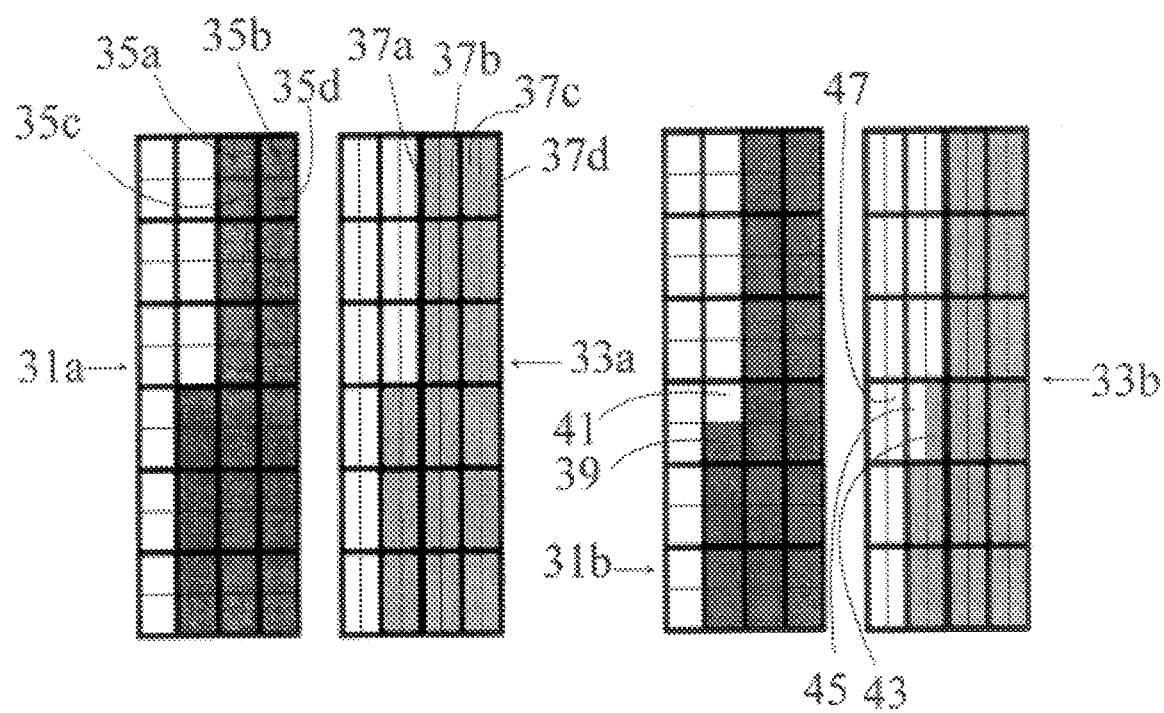
FIG. 2a, FIG. 2b, FIG. 2c, and FIG. 2d illustrate the revisions of the bit map for a sloped, generally vertical line or edge.
Figures 2C, 2D:
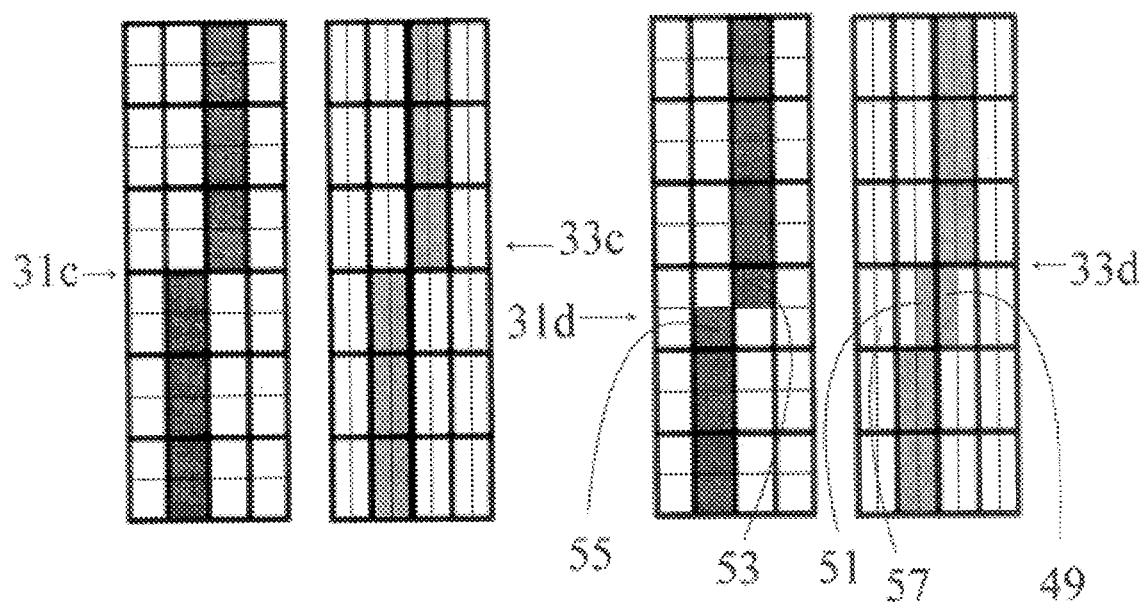

FIG. 2a through FIG. 2d illustrates the bit map produced in accordance with this invention for configurations appearing in final printing as slanted, predominantly vertical lines or edges. The four illustrations on the left of the pairs of illustrations, 31a of FIG. 2a, 31b of FIG. 2b, 31c of FIG. 2c, and 31d of FIG. 2d, illustrate actual bit maps of data in 1200×1200 dpi resolution. Dark areas represent bits of significance for black printing (or other color) as distinguished from not printing (or contrasting color). The four illustrations on the right of the pairs of illustrations, 33a of FIG. 2a, 33b of FIG. 2b, 33c of FIG. 2c, and 33d of FIG. 2d, illustrate the bit maps which the printer 1 actually prints in pel locations. These are in 600×2400 dpi resolution.

Four bits in 31a in the top right square, 35a, 35b, 35c, and 35d, illustrate bits which coincide in position with four rectangular bits 37a, 37b, 37c, and 37d in FIG. 33a. Although not replicated through FIG. 2b, FIG. 2c, and FIG. 2d, will be apparent that four contiguous bits in a square, in the high resolution bit map, such as 35a–35d, are the data for which the logic of this invention determines the data of the four bits in corresponding positions in the printing resolution bit map (i.e., the content of 35a–35d determines the content of 37a–37d.

In the preferred embodiment two vertical pels in the high resolution bit map, such as pels 35a and 35c, are a pel group which determines the content of corresponding pels groups in the printing resolution bit map (i.e., pels 35a and 35c determine the content of pels 37a and 37b).

In FIG. 2a, 31a illustrates a pattern of the high resolution bit map, which can and is replicated in the bit map for printing 33a to exactly follow the bit map 31a. In FIG. 2b bit map 31b is very similar but has a single black bit 39 within two bits 39 and 41 of the high resolution bit map 31b which correspond to two bits 43 and 45 in printing resolution bit map 33b. Logic 21 of this invention observes the significance of bits 39 and 41, observes that bit 39 is a single black bit, and responds by producing a single black bit 43 in the printing resolution bit map 33b. Black bit 43 is on the right side, which is the result of logic 21 reacting to pel 47, on the right of the preceding pel group, being white.

Illustrations 31c and 33c of FIG. 2c also show a higher resolution configuration 31c which can and is duplicated at the printing resolution bit map 33c.

Illustrations 31d and 33d of FIG. 2d illustrate the other occurrence in which the printing resolution bit map, 33d, is formed with two black bits 49 and 51, each created because only one black bit 53 and 55 respectively appears in the corresponding high resolution bit map pel group. Pels 49 and 51 are located side-by-side since logic 21 of this invention responds to the pel 57 of the previous pel group being white by placing pel 51 on the right of its pel group and responds to pel 51 being black by placing pel 49 on the left of its pel group.

Figure 3A:
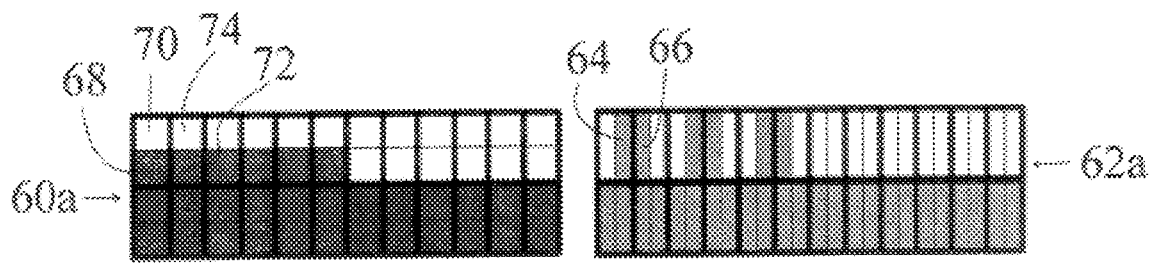
FIG. 3a, FIG. 3b, FIG. 3c, and FIG. 3d illustrate the revisions of the bit map for a sloped, generally horizontal line or edge.
Figure 3B:
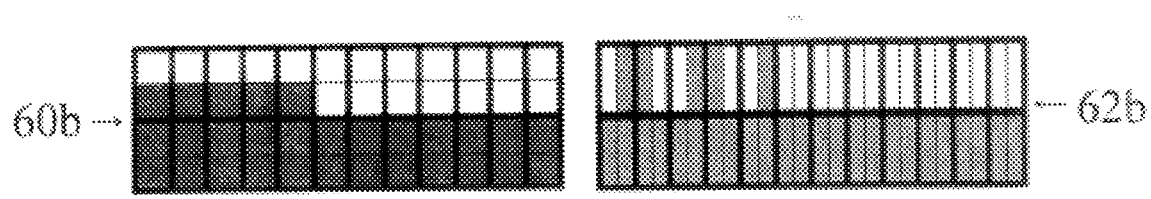
Figure 3C:
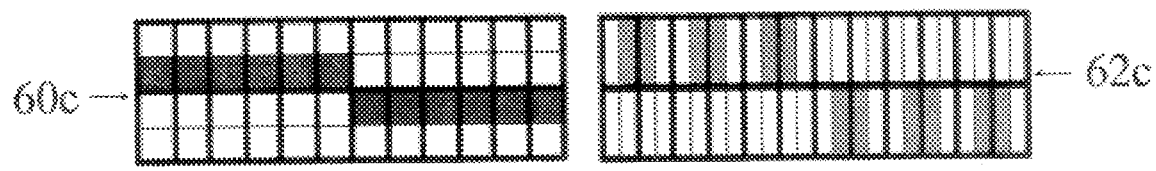
Figure 3D:
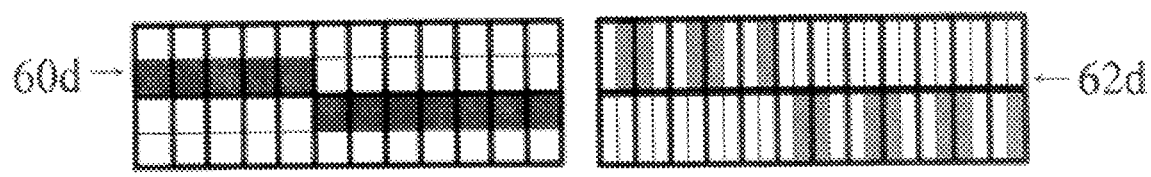

FIG. 3a, FIG. 3b, FIG. 3c, and FIG. 3d illustrate the bit map produced in accordance with this invention for configurations appearing in final printing as slanted, predominantly horizontal lines or edges. As in FIG. 2a–FIG. 2d, 60a of FIG. 3a, 60b of FIG. 3b, 60c of FIG. 3c, and 60d of FIG. 3d illustrate the high resolution bit map, and 62a of FIG. 3a, 62b of FIG. 3b, 62c of FIG. 3c, and 62d of FIG. 3d illustrate the printing resolution bit map produced in accordance with this invention. None of these configurations can be identically reproduced. Black bits 64 and 66 in half black pel groups in the printing resolution bit map correspond to pel groups in the high resolution bit map that are half black (i.e., bit 64 corresponds to bits 68 and 70 and bit 66 corresponds to bits 72 and 74)and therefore are placed side-by-side as shown. Implementation is as discussed with respect to FIG. 2.

Figure 4:
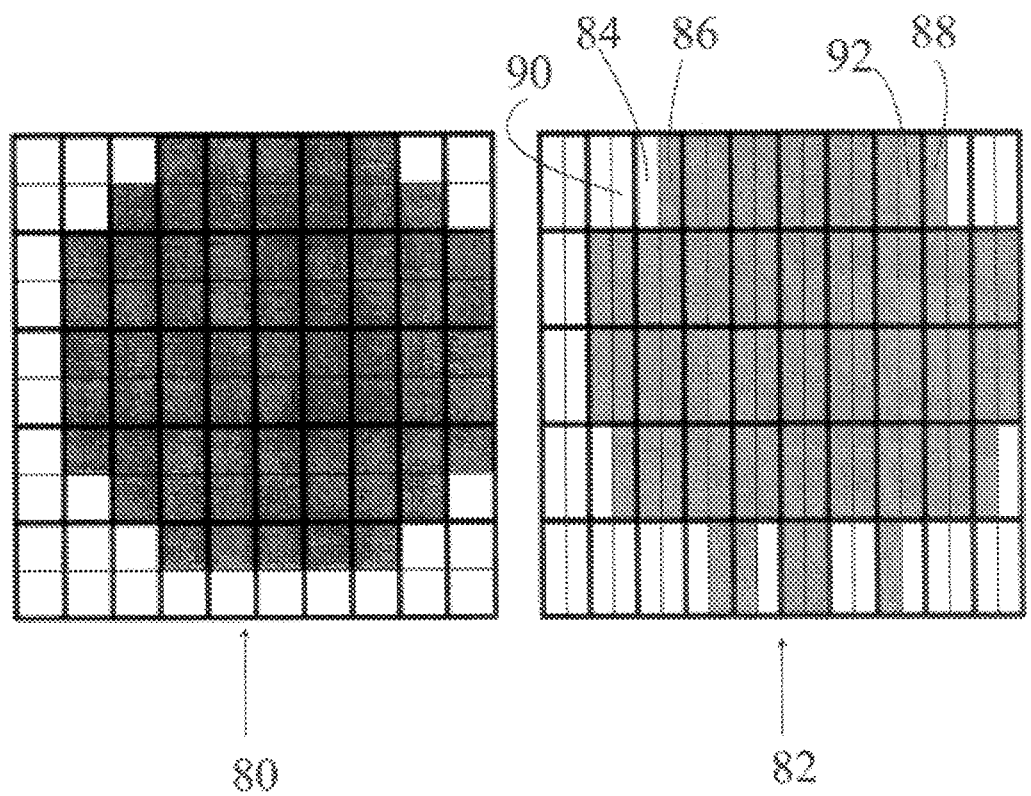
FIG. 4 illustrates the revision of the bit map for a more varied pattern.

FIG. 4 illustrates essentially the same subject matter as FIGS. 2 and 3 with a more varied pattern. Illustration 80 is of the high resolution bit pattern and illustration 82 is of the printing resolution bit pattern. Bit 86 in the pel group of bits 84 and 86 in the printing resolution bit map 82 is to the right because logic 21 reacts to the content of the right pel 90 in the preceding pel group by placing bit 86 on the right, since the preceding bit 90 is white. Similarly, logic 21 places bit 88 on the left since pel 92 is black.

Figure 5:
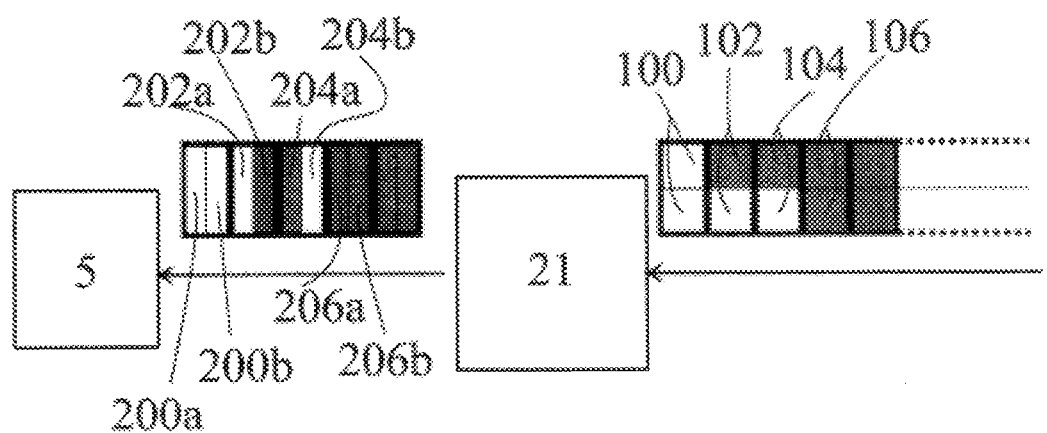
FIG. 5 illustrates the logic as it operates at the time of final printing.

FIG. 5 is illustrative of the operation of logic 21 in actual operation as control signals are delivered to printhead. Data for two adjoining 1200×1200 lines is applied to logic 21. Logic 21 determines if pel groups, such as 100, 102, 104 and 106, are all black, all white, or half black and half white. Thus, printing resolution pels 200a and 200b are both white because the two pels of pel group 100 are all white. Pels 202a and 202b are one white and one black because pel group 102 has one white pel and one black pel. Similarly, the pels 206a and 206b are both black because the two pels in pels group 106 are both black. Logic 21 also determines whether the data for the preceding pel group (200b with respect to data 202a and 202b) is white. If the preceding data, such as 200b is white, then a single black pel is assigned to 202b, which is the right pel of the pel group of 202a and 202b. The next operation, with logic 21 responding to pel 202b being black, assigns a single black to pel 204a, which is the left pel of the group of pels 204a and 204b and therefore places the two black pels, 202b and 204a side-by-side. Had pel 202b been white, logic 21 would assign a single black pel for the next pel group to 204b, thereby putting that black pel side-by-side with any black pels in the group of pels 206a and 206b. In any event the output of logic 21 preferably is just before that output is delivered to optical system 5 as modulation for its illumination under control of data processor 17.

Optical system 5 is not turned off at the boundary of two on pels. With two pels side-by-side, the effect is lower frequency operation, which is more reliable and accurate and which produces less electromagnetic noise. Bandwidth requirements on all components driving printhead 5 are correspondingly reduced.

The printing is excellent and entirely comparable to identical printing with optical system 5 from 1200×1200 data. This is true because the toner or other imaging material applied tends to integrate the actual printing effects in that it tends to spread and become rounded. The human eye similarly tends to integrate what it observes.

The printer operates in its natural mode with no change in speeds or throughput. Each bit of bit map data is typically examined and potentially modified just before printing for purposes of resolution enhancement, so examining two bits in accordance with this invention adds only the need to assemble two lines of bit map data as described with respect to FIG. 5.

The bit map adjustment of this invention can readily be done in a host computer and then transmitted to the printer. Other variations within the spirit and scope of this invention will be apparent and can be anticipated.

We claim:

1. An imaging device assembly comprising logic to monitor a first bit map in a first resolution greater than 600×600 dpi, imaging apparatus to control printing at pel locations in a second bit map in a second resolution of at least 600×at least twice said 600 dpi, said logic producing signals controlling the printing of said imaging apparatus of said first bit map when data in said first bit map corresponding to the resolution of said second bit map can not be identically printed which locates printing by said imaging apparatus in adjoining pels next to at least one non-printed pel said logic defining adjoining pels by determining the location of printing of the pel adjoining the pels to be printed and assigning the current printing to be on the right of the current group of pels if the adjoining pel is on the right and has printing and otherwise assigning the current printing to be on the left or assigning the current printing to be on the left of the current group of pels if the adjoining pel is on the left and has printing and otherwise assigning the current printing to be on the right.

2. The imaging device as in claim 1 in which said first resolution is 1200×1200 and said second resolution is 600×2400.

3. The imaging device as in claim 2 in which said logic defines adjoining pels by determining the location of printing of the preceding pel which adjoins the pels to be printed and assigning the current printing to be on the left of the current two pels if the preceding pel has printing and otherwise assigning the current printing to be on the right.

4. The imaging device as in claim 1 in which said logic defines adjoining pels by determining the location of printing of the preceding pel which adjoins the pels to be printed and assigning the current printing to be on the left of the current group of pels if the preceding pel has printing and otherwise assigning the current printing to be on the right.

* * * * *